United States Patent
Lopez et al.

(10) Patent No.: US 8,543,134 B2
(45) Date of Patent: Sep. 24, 2013

(54) INTERACTIVE COMMUNICATION AND TRACKING DOG COLLAR

(76) Inventors: David Lopez, Angola, NY (US); Brianna Van Cheri, Angola, NY (US)

( * ) Notice: Subject to any disclaimer, the term of this patent is extended or adjusted under 35 U.S.C. 154(b) by 0 days.

(21) Appl. No.: 13/437,055

(22) Filed: Apr. 2, 2012

(65) Prior Publication Data

US 2012/0252486 A1     Oct. 4, 2012

Related U.S. Application Data

(60) Provisional application No. 61/469,947, filed on Mar. 31, 2011.

(51) Int. Cl.
    *H04W 24/00*     (2009.01)

(52) U.S. Cl.
    USPC .................. 455/456.1; 455/411; 455/442

(58) Field of Classification Search
    USPC .............. 455/456.1, 411, 442, 569; 345/156; 379/908
    See application file for complete search history.

(56) References Cited

U.S. PATENT DOCUMENTS

| | | | |
|---|---|---|---|
| 6,067,018 A | 5/2000 | Skelton | |
| 6,874,447 B1* | 4/2005 | Kobett | 119/712 |
| 7,411,492 B2 | 8/2008 | Greenberg | |
| 2002/0021219 A1* | 2/2002 | Edwards | 340/573.1 |
| 2007/0204804 A1 | 9/2007 | Swanson | |
| 2007/0221140 A1* | 9/2007 | Warren et al. | 119/859 |

* cited by examiner

Primary Examiner — Manpreet Matharu
(74) Attorney, Agent, or Firm — Daniel Boudwin

(57) ABSTRACT

A wirelessly interactive dog collar is disclosed, comprising a neck collar having imbedded features that allow voice commands and tracking over long distances, along with features that facilitate tracking and visualization. The device comprises an elongated collar adapted to fit around a dog's neck having an internal compartment housing a cellular connectivity electronics module, a power supply and wiring to a plurality of speakers, light sources and a global positioning tracking antenna. The device provides a cellular phone antenna and means to transmit and receive voice transmissions through a cellular network, facilitating an owner's ability to track the animal and initiate voice communication. Light sources around the collar improve visualization of the pet at night, while the GPS tracking unit provides a backup to cellular triangulation, allowing location determination over long distances.

5 Claims, 5 Drawing Sheets

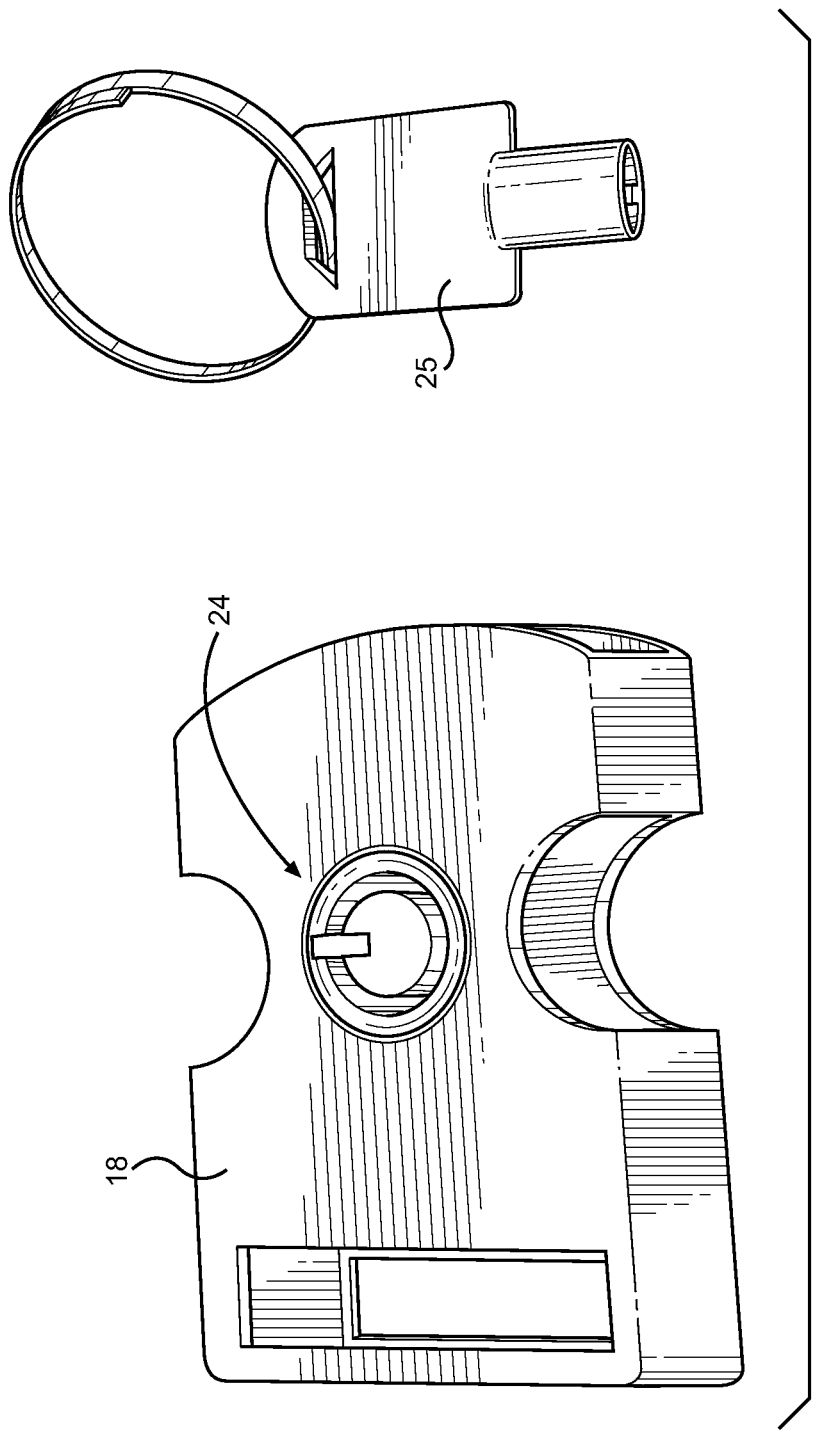

INTERACTIVE COMMUNICATION AND TRACKING DOG COLLAR

CROSS REFERENCE TO RELATED APPLICATION

This application claims the benefit of U.S. Provisional Application No. 61/469,947 filed on Mar. 31, 2011, entitled "Rover."

BACKGROUND OF THE INVENTION

Field of the Invention

The present invention relates to dog leashes and collars. More specifically, the present invention pertains to an animal collar having cellular network connectivity to facilitate tracking of an animal and greater communication therewith over great distances. The device further provides improved low light visualization of the collar and the ability to communicate with the animal or an individual who has recovered the animal after it has strayed away from its home. Applications of the present invention include recovery of a lost or stolen pet, facilitating communication during a hunting exercise, communication with service animals in the military/law enforcement/rescue operations, and finally for animal training purposes.

Preventing domesticated house pets from straying away from human supervision or their home is a serious concern for many owners. Dogs in particular can wander away or stray without concern for their home when left alone outside of the home or when an entryway is left open. To ensure safety of the pet and prevent the pet from becoming lost, most owners keep their pet indoors, enclosed within a fenced area or tethered to a location or run line such that they are prohibited from wandering away. However, such means of containment are not foolproof, particularly if the animal is left unattended for long periods of time, wherein the animal may find a way to escape a fenced area, find holes in an electric fence or disengage from a tether device. For this reason, animal identification collars generally include the animal's and their owner's contact information, such that retrieval of the animal is possible after being corralled or taken in by another individual. This allows the owner to be contacted or authorities to locate the animal's home.

Basic animal collars are necessary devices for identifying the animal and the owner's information; however they are less than effective for locating the animal while it is still loose or engaging in communication therewith during this period. More advanced means of tracking stray animals include subcutaneously imbedded identification chips, which allow authorities to identify the animal and its owners without a collar being present. More advanced collar devices include radio communication with a base station as to the proximity of the animal, while still further advanced collars include imbedded Global Positioning System (GPS) connectivity for locating the animal over greater distances. These advanced collars also include the animal and owner identifying information to be electronically stored and retrieved after the animal is found. The present invention relates to a more advanced animal collar and communication device, wherein a new dog communication collar is provided having a cellular network connectivity in which an owner, trainer or controller is able to have direct communication with the animal and a means for directly tracking its movement utilizing a cellular phone device, which is a significant improvement in the art of animal tracking, communication and retrieval collars.

Example situations in which direct animal communication and electronic identification may be required include instances in which the animal strays from its home and becomes lost. This is possible if the pet is left unattended for long periods and is able to test its boundaries, as in the case of when an owner is away at work, on vacation, or is less than diligent with regards to the animal's status. If the animal is left unattended in an outdoor environment, such as a large backyard, the animal, and in particular dogs, may burrow beneath fences, find weakness or openings in a physical fence or further learn when an electric fence is disengaged due to a power outage or learn of a gap in the electric fence perimeter. Further still are situations in which a pet is taken into open spaces and allowed to play freely, such as open parks and recreation areas. If the animal decides to run away, the owner has little recourse but to chase after the animal. Once a sufficient gap is achieved between the two, tracking and direct communication with the animal becomes extremely difficult or further impossible if the animal leaves the vicinity. The present invention is intended to improve overall communication with a given animal in such situations wherein the animal has strayed from its home and retrieval is desired.

Another application of the present invention relates to hunters and hunting activities. During a hunting expedition, a hunting dog may be employed to track, retrieve or flush out target prey. Coordination between the dog and the hunter is a critical factor in the ability to facilitate these activities. The present invention allows the hunter to direct the dog through voice commands without raising his voice, and further allows the hunting dog to be readily visible in low light situations if desired by the hunter. If the dog becomes lost, is tracking a prey animal beyond visual range, or is hunting at night, the collar allows the hunter to instantly track and visualize the dog location, while also providing the ability to given the dog direct voice commands.

Another key application of the present invention is the ability of a military, security or law enforcement canine operator to direct a working dog without raising their voice or shouting over large distances. Coordination between the controller and the dog is accomplished over the cellular network, wherein voice commands can be transmitted to the dog. During search and rescue operations, the collar can be utilized to transmit a victim location and allow the victim to have direct communication with a controller or rescue personnel. The dog is able to track a victim location without being tethered to its controller, whereafter the dog location can be tracked, voice commands may be given and communication with a recovered individual may be facilitated through the use of the present collar.

The present invention is a cellular connectivity device that is imbedded into an animal collar. The device allow a user to control the operation of the collar by dialing a preset phone number, which activates communication and other actions on the collar, while facilitating voice communication between distant parties. The animal location is triangulated within the cellular network to provide positional information, while a backup GPS transponder may be provided to transmit geographic location outside of cellular network range. The collar further includes identifying information about the pet and owner, and allows an individual to directly dial the owner in the event the animal becomes lost and recovered without the owner's awareness. The present invention provides a unique animal communication and location device that fulfills several roles that are otherwise unfulfilled by devices currently available and in the prior art.

DESCRIPTION OF THE PRIOR ART

Within the prior art there exist animal collar devices having related tracking and communication means of varying design and function. These devices employ familiar design elements for the purposes of creating a wearable animal tracking collar that is readily operable in conjunction with different wireless communication systems for tracking and locating a lost pet. These generally relate to the use of GPS transponders, proximity sensors that relay relative position of an animal within a given zone and devices that electronically store identifying animal and owner information. Patents have been issued and patent applications published in the prior art for devices of these type, wherein the disclosures deemed most relevant to the present invention are described below. These devices fail to disclose the novel aspects of the present invention, namely its cellular network connectivity, flexibility of use and its plurality of functions through the cellular connection that facilitate communication and tracking of domestic and working animals for their human owner or operator to utilize in a plurality of conceivable situations. These include general location tracking and communication with the animal, improving hunter communication and coordination, military/law enforcement/rescue operator applications and general trainer use with a number of conceivable animals, the most relevant being a dog. The following are submitted as relevant prior art devices and are described herein to readily differentiate the present device over existing collars.

Specifically, U.S. Pat. No. 6,874,447 to Kobett describes a method and apparatus for tracking and controlling a hunting dog within a given proximity to a hunter, wherein communication is established between the dog and a hunter via a receiving handset and a remote transmitter assembly carried by the dog. A transceiver in electric communication with an enunciator, wherein audible commands can be wireless transmitted between the hunter and dog for controlling the dog during a hunt within a given separation distance. Audible tones and voice commands are transmitted to the remote assembly, adapted to provide improved communication between the dog and hunter. The Kobett device is adapted to provide a unique handset that allows voice transmission and tones to be sent to a hunting dog during a hunting event, providing improved control thereof to facilitate hunting of other animals. This device relates more closely to a two-way radio and proximity tracking device, as opposed to a device of the present invention in which cellular connectivity is employed to facilitate tracking and voice communication with the hunting dog. The present invention further provides an imbedded GPS transponder when access to a cellular network is not possible, such as a hunting expedition in more remote locations. This allows an owner to track and to communicate with their dog over greater distances, facilitating recovery of a lost pet or active communication during a hunting activity. The device further provides a leash having elements that improve visibility and information about the pet if ever lost. The intent of the present invention diverges from the Kobett device, along with structural elements and electrical components.

U.S. Pat. No. 6,067,018 to Skelton is another device that discloses a pet remote monitoring system that automatically activates an alarm when a pet becomes lost, alerting an owner that a pet has left a certain area via a wireless signal that relays to a base station. A portable unit is provided that attaches to the pet to allow tracking thereof over cellular networks or via GPS. Once the pet has left a predefined area, a signal is sent to the base station. The base station then places a telephone call to the pet owner for notification purposes. The device further provides a tracking means that utilizes cellular networks to transmit registration messages in order to triangulate the collar position. While providing a means to locate a pet using a cellular emulator that transmits signals to a cellular network, the Skelton device does not allow direct communication between a pet owner/operator and the given animal over a cellular network. The Skelton device further requires a base station in order to facilitate a phone message to the owner in the even the animal has strayed from a given zone. While utilizing a cellular network to transmit location, the present invention is a more advanced means of communication and location determination. The present invention utilizes direct cellular communication to control, track and visualize a given animal Further, U.S. Pat. No. 7,411,492 to Greenberg describes a tracking system that includes GPS and a modem for tracking a pet once the pet has wandered beyond the boundaries of an established virtual fence. The virtual fence is a portable system that sends a signal based on a to-be-fenced pet or individual that alerts a breach of the fence boundary, activating the system to begin tracking. The Greenberg device is primarily tracking a person, pet or item within a defined area and alerting/locating a user via a modem for mobile communications that sends a signal to base station. This device is primarily for tracking items within a local area and ensuring the target item does not leave the confines thereof. The present invention is intended as a multi-use collar that can be used for tracking a lost pet, providing a means to locate and communicate with a hunting dog and for establishing direct communication between a Samaritan and an owner who may have lost a pet.

Similar in nature to the Greenberg device is Published Patent Application Publication Number 2007/0204804 to Swanson, which discloses a pet containment system that relies on GPS tracking to determine the direction of travel within a perimeter boundary to determine whether a corrective shock is administered. An accelerometer and GPS device within a dog collar determine if a dog or similar animal has breached a perimeter fence, and thereafter does not shock the animal once the animal attempts to return to its keeping area. Utilization of the Swanson device eliminates the need to burry a perimeter hidden fence, and further eliminates those situations in which a dog breaches the fence and is trapped on the outside without confusing shocks when trying to re-enter. The present invention provides a cellular connectivity collar of differing intent and spirit. The elements of present invention are further divergent from the Swanson device, which is adapted to administer 'corrective' shocks to contain an animal within a given area. The present invention provides a means to locate and retrieve a lost pet or communicate with a hunting animal.

Finally, U.S. Published Patent Application Publication Number 2002/0021219 to Edwards discloses an animal tracking collar that utilizes a GPS signal and broadband wireless communication networks to locate and stream live video from the point of view of the collar to a remote computing device. The use of both GPS coordinates and a view of from the lost animal allows an owner or tracker to quickly locate and retrieve the animal if lost or strayed. The Edwards device provides a novel means of further informing an owner or individual in search of a pet, however it fails to consider the capabilities provided by the present invention. In particular, the present invention provides a means to locate a lost pet or to communicate with a hunting dog during an outing. The elements of the present invention provide several means to locate, communicate with and retrieve an animal using an advanced collar system that can communicate over cellular networks with an owner or master.

The present invention comprises an advanced locating and communication collar with an animal, and more particularly to a domestic or hunting dog. The elements include a direct means of communication through a cellular network, a callback feature to allow communication with an authority or individual who has recovered the pet, a back-up GPS locating means, pet identification information and improved low-light visualization. Its elements, operation and flexibility of use are substantially divergent from the prior art, consequently it is clear that there is a need in the art for an improvement to existing animal locating and communication collars. In this regard the instant invention substantially fulfills these needs.

SUMMARY OF THE INVENTION

In view of the foregoing disadvantages inherent in the known types of animal locating and communication collars now present in the prior art, the present invention provides a new animal collar device wherein the same can be utilized for providing convenience for the user when communicating, tracking and recovering an animal using an interactive, cellular connectivity collar.

It is therefore an object of the present invention to provide a new and improved animal locating and communication collar device that has all of the advantages of the prior art and none of the disadvantages.

It is another object of the present invention to provide an animal locating and communication collar that is capable of connecting to a cellular network in able to track the collar location, allow direct communication with an owner, operator or third party individual, and facilitate improved control and tracking of the animal through voice commands.

Another object of the present invention is to provide an animal locating and communication collar that utilizes several locating means, most notably a cellular network tracking means, a back-up GPS tracking unit, and a plurality of light sources around the length of the collar for visual tracking in low light environments.

Yet another object of the present invention is to provide an animal locating and communication collar that is adapted for both commercial, domestic and military use, wherein the communication and tracking elements of the collar are well adapted for individual pet owners, hunters, law enforcement, rescue personnel, military operators, security personnel and professional trainers.

A final object of the present invention is to provide a collar with the aforementioned qualities that also includes a locking securement means and animal identification screen, such that the collar remains secured to the animal and its information can be easily visualized for third-party animal recovery purposes.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 5 shows the locking clasp of the present animal collar device.

DETAILED DESCRIPTION OF THE INVENTION

Figure 1:
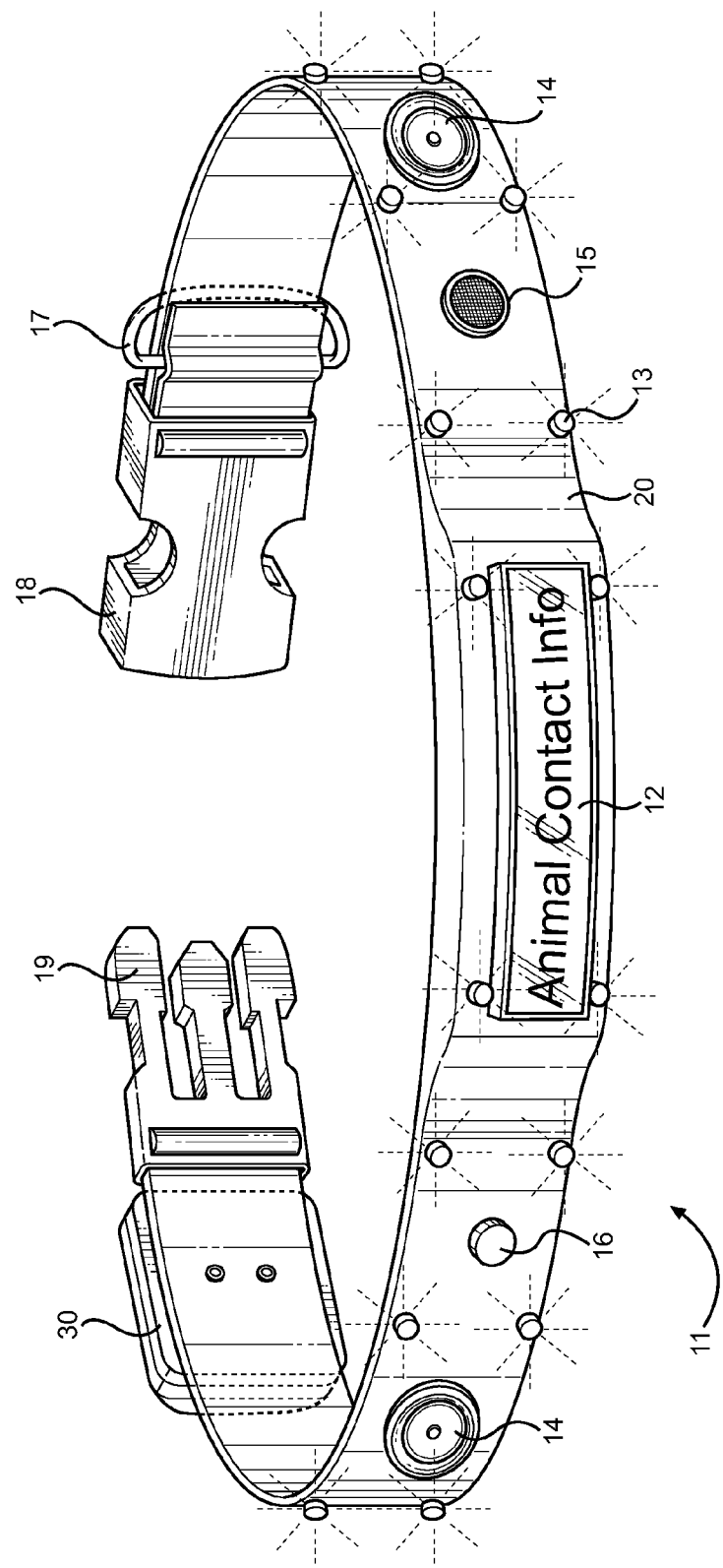
FIG. 1 shows a perspective view of the present animal collar.

Reference is made herein to the attached drawings. Like reference numerals are used throughout the drawings to depict like or similar elements of the animal locating and communication collar. For the purposes of presenting a brief and clear description of the present invention, the preferred embodiment will be discussed as used for tracking and communicating with lost animals or hunting dogs. The figures are intended for representative purposes only and should not be considered to be limiting in any respect.

Referring now to FIG. 1, there is shown a perspective view of the present animal locating and communication collar of the present invention. The collar 11 comprises an elongated band adapted to encircle the neck of an animal in a similar fashion as most dog collars present in the art. The collar 11 employs several imbedded features that facilitate tracking of the collar location, and further allow an owner to directly communicate with the animal and to a third-party individual in proximity to the animal, where the collar is utilized as a voice transceiver means. The collar 11 forms a central interior cavity within which a plurality of electronic elements is present, along with necessary electrical wiring and routing. Within the interior cavity is stored the internal electric components necessary for operation of the present device. The most notable of those components is an electronic circuit board comprising digital signal processor, internal memory and a microprocessor having programmable logic to coordinate all electrical elements of the device and facilitate their function through received inputs. The microprocessor and associated circuit board are akin to a cellular phone circuit board, which processes signals to enable voice signals to be received and transmitted via a cellular antenna and facilitated through the plurality of electrical components within the collar. Also provided along the collar are a plurality of LED light sources 13, a GPS tracking and cellular antenna unit 30, a plurality of speakers 14, a microphone 15, and an animal information and collar control display screen 12. The electronic devices work together to facilitate several cellular and GPS tracking features, as well as direct voice communication and low light visualization to provide utility across a broad range of foreseeable situations and applicable scenarios.

The microprocessor is a programmable electronic device within the imbedded electric circuit that interprets electrical signals from the various electronic components within the collar to allow for several operating modes and collar functions during deployment. Along with the microprocessor is computer memory in which to store the animal's and owner's contact information, along with all imbedded code necessary for operation of the assembly and a power supply to power all functionality. The collar operation initiates with a cellular phone call from the user or operator to a preset number associated with the collar. The call is transmitted over a cellular network, which is processed by the collar to initiate direct two-way communication between the user operating the cellular phone and the animal wearing the collar or a third-party located in proximity thereto. Functions of the collar may be initiated over the cellular network, wherein keypad inputs can initiate certain actions, such as operation of the light sources 13 or an audible signal for which the user to orally track the animal over a given distance. In the event of the collar exiting a usable cellular network, the back-up GPS transponder may be utilized to geographically map the collar location. Preferably, however, the cellular network is utilized to track the collar by way of tracking the collar cellular output signal angle of approach to a nearby cell tower, length of time it takes the outgoing signal to travel to multiple towers, and finally the strength of the signal when it reaches the towers. These three variables can each be utilized to track or triangulate the position of the collar without the use of the back-up GPS.

The most basic tracking function is via visual reference. Along the length of the collar 11 is a plurality of high intensity Light Emitting Diode (LED) light sources 13 which allow an owner or operator to visualize the animal at night and to prevent avoidable collisions with moving vehicles if the animal were to stray. The light sources can be switched on when the user initiates cellular connectivity, wherein the lights automatically engage or a keypad option is chosen during the connection.

A more advanced means of tracking the collar location over larger distances is also provided. Specifically, the cellular network connectivity and a back-up Global Positioning System (GPS) tracking unit 30 is attached along the collar for the transmission of the collar geographic location if the animal were to stray or otherwise become lost. The tracking unit broadcasts a signal that is interpreted by the cellular network to track location, while the GPS can further be utilized to track the collar location using satellite connectivity. A corresponding tracking software program on a computer, tablet or handheld device is capable of mapping the broadcasting tracking unit location on a map to provide guided direction to the collar location. This allows the user to realize the animal's location relative to his or her location and to take action to locate and retrieve the animal. The tracking unit 30 provides pinpoints the location within a given tolerance at considerable distances from the user's location, wherein connection is capable as long as cellular or satellite communication is available. This functionality may be imperative in situations where an animal, such as a dog or cat, is able to leave its residence and stray over great distances, in situations in which a hunting dog is out of visual range of the hunter, or finally in military and rescue operations wherein a working dog is deployed to locate or track a target. The animal location can be continually tracked beyond visual range, which may be imperative in the aforementioned scenarios.

The cellular antenna is one that is capable of connecting to a specific cellular network, such as CDMA, GSM or similar network, wherein direct communication between the user and the animal, and further the user and another individual who may have recovered or be in proximity to the user's animal, is possible. This direct communication link allows a user to communicate directly with the animal, giving the animal voice commands or directions wherein the distance between the two may make it inefficient, inappropriate or impossible to establish oral communication otherwise. The specific collar is activated through a cellular provider and includes a specific phone number for the user to dial on his cellular device for communication therewith. The owner or operator may issue commands, for instance during a hunting exercise, during training or if the animal is of great distance but still within visual range, to which the animal may respond accordingly. Two-way communication is established, wherein a third party may be able to communicate with an owner or operator, which can facilitate swift recovery of a lost pet or communication with an individual requiring rescue, in the case of a rescue or military working dog. Further provided on the collar is a call back button 16, which allows another individual initiate an outgoing call to the user's cell phone to communicate via the established cellular link. This allows an individual to call an owner if the dog has strayed and the owner is unaware of the occurrence. This also allows a dog to enter hostile areas and establish communication with a hostage or trapped individual, wherein communication with rescue, enforcement or military personnel is possible. The callback feature is an advanced means of tracking the animal through direct voice communication, wherein a pedestrian may have recovered a lost animal, or animal control may have custody and further may be attempting to contact the animal's owner. The voice communication operates over the cellular network and relays voice signals from the collar via a plurality of speakers 14, which allow the commands to be projected therefrom. A microphone 15 is further provided to allow the user to listen to the environment through the animal collar, and to communicate with third-party individuals. This allows for espionage activities using an animal as a conduit for transmitting audio signals, and further allows two individuals to establish direct communication. Along with this communication, the attached display screen 12 further includes identifying and contact information if the collar is unable to make contact directly with the owner via a cellular connection.

Turning to the structural components of the present invention, it is noted that a collar device of this sophistication may be prone to theft, and further its intended use may be compromised if the collar is easily removable from the animal's neck without the owner's permission or intent. For these reasons, the collar 11 connects around the animal's neck via a buckle 18 and clip 19, wherein the buckle 18 further comprises a key-locking mechanism that locks the clip 19 into the buckle 18 when engaged and prevents dislodgement without the appropriate key release means. The collar itself can be made of a slash-proof material to prevent the collar from tampering or easy cutting and removal from the animal, which may be desired due to the complexity of the collar and its inherent value. The collar too, while serving as a means of communication, location and identification, also facilitates attachment of a leash to a lease attachment loop 17, which enables the device to function as a standard animal collar for use with dogs or similar pets.

Figure 2:
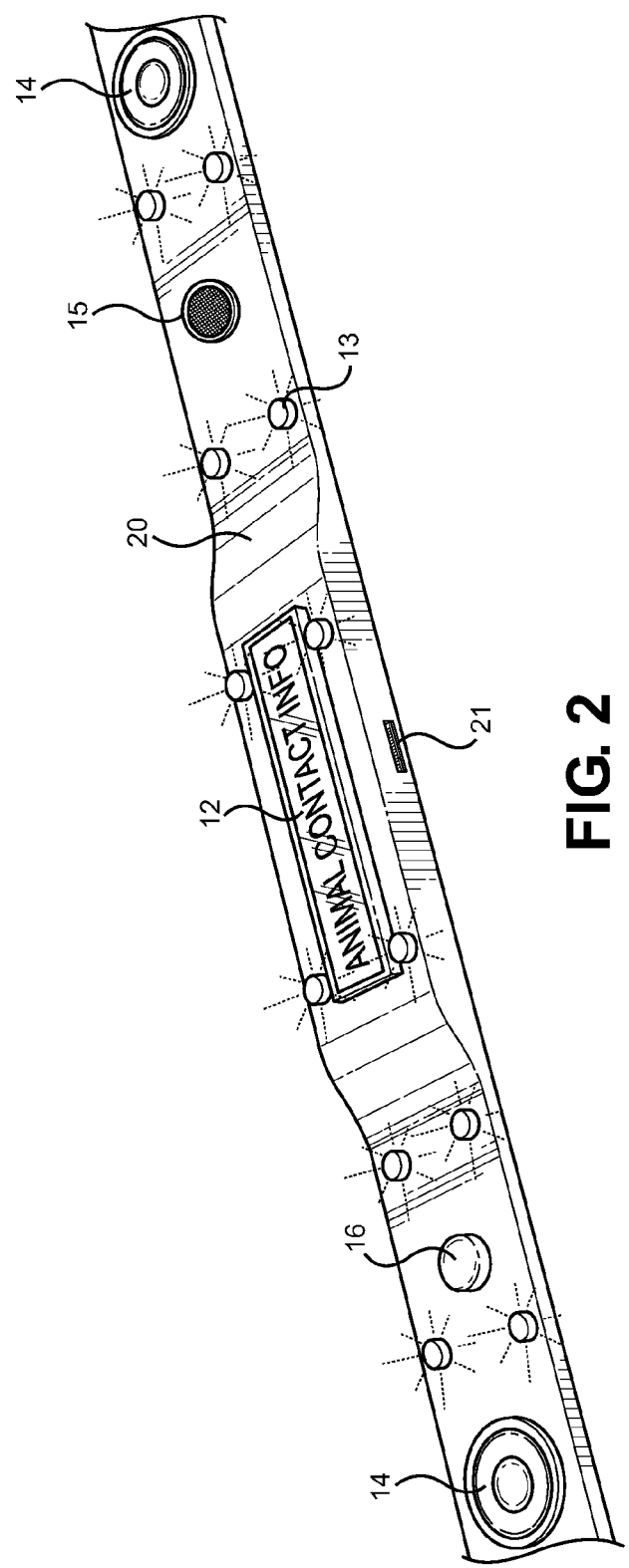
FIG. 2 shows another perspective view of the present animal collar.

Referring now to FIG. 2, there is shown an overhead perspective view of the present animal collar of the present invention, centered about the display area 12 and the electronics housing 20 that provides space for the electronic controller elements of the device: most notably the microprocessor, memory, power and electrical connections to all periphery devices installed around the collar. At the base of the housing 20 is an electrical power input and data connection 21, preferably a Universal Serial Bus (USB) connection, which allows connection to a personal computer and for charging the internal power supply of the collar for prolonged, independent operation. The USB connection 21 allows data to be uploaded onto the memory of the device, such as contact information about the pet and owner, user operation options selection and preferences, and further any information that the owner may desire to display on the display screen 12 of the collar. Wiring from all periphery devices, such as the LED light sources 13, microphone 15, speakers 14, call-back button 16, and tracking unit are provided through an internal cavity within the length of the leash that allows direct routing to the housing 20 and connection to the microprocessor and associated circuit board therefor. In a further embodiment of the device, an external user input may be provided on the housing 20, such as a depressible button or plurality thereof so that the display screen 12 may be cycled through various screens for options to be chosen during deployment of the device. These options may include operation of the light sources, volume of the speakers, highlighting the display screen 12 in low light, and finally controlling operation of the antennas to conserve battery usage.

Figure 3:
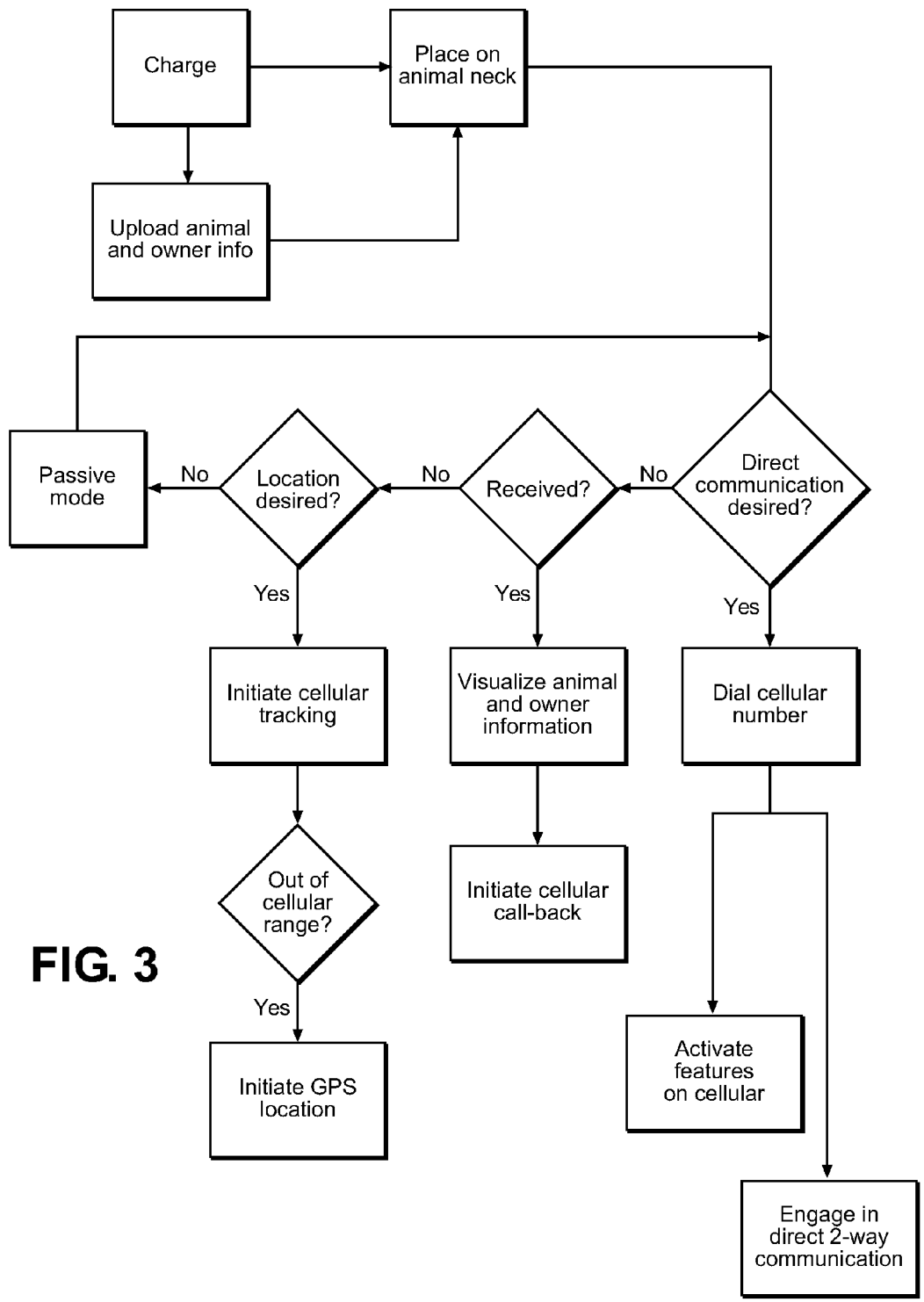
FIG. 3 shows a flow diagram of the functionality of the present animal collar, and example situations wherein it may be suitable.

Referring now to FIG. 3, there is shown a flow diagram outlining example operational usage of the present dog collar device, wherein several scenarios and operational choices are displayed. The goal of these flow diagrams is to outline an example operational outline for the device, wherein its internal programming is set to operate is a specific logic and take action based on user input. In the initiation of the device, the collar must be sufficiently charged to sustain prolonged usage. Generally if an animal strays, the collar must be active and allow communication or locating activity over a sufficient time period to allow recovery, wherein initial realization of a lost pet may not be immediate. Further, the use of such location and communication systems may draw considerable battery power, particularly in hunting situations where voice communication may actively be utilized and operation of the light sources may be heavily relied upon. The animal and owner identifying information, along with operational preferences are also stored onto the memory of the device during this initialization period prior to the collar being deployed onto the animal's neck.

The programming of the device is such that various options are provided for several foreseeable situations. The given flow diagram is an example embodiment that contemplates several situations in which the present collar may be suitable, however it is not desired to limit the function of the present device to this set of logic or short list of example uses. The primary operational modes of the collar include active tracking of a lost pet, direct communication through the collar, call-back recovery from a third-party and a passive mode that conserves battery life. If direct communication is desired between the user/operator and the animal or individual in proximity to the animal, the user initiates an outgoing phone call from a phone to the number assigned to the collar Electronic Serial Number (ESN). The call is answered by the collar circuitry to establish a two-way conversation that allows direct voice communication from the user/operator and from the animal/third-party individual/nearby environmental sounds. While the phone call is active, the user can operate various features on the collar, including activating the light sources, activating an audible alarm or similar feature that is programmed into the collar logic based on keypad input from the user.

If the animal has strayed from its home or owner and subsequently recovered by animal control authorities or a pedestrian, the individual recovering the pet can gather pertinent information programmed into the collar by accessing and visualizing the display area. This provides identifying information of the owner and the animal, as well as any further information programmed thereon. The individual may attempt to contact the owner or return the animal from this information alone, or further initiate an outgoing call-back phone call directly to the owner's phone. This allows a direct two-way connection between the individual recovering the animal and the owner, after which the two can coordinate the return thereof.

The final option of the collar is one in which the collar location may be tracked and pinpointed. Through the use of the cellular network and local towers, the device location can be determined. The collar sends outgoing signals to the cellular towers to establish connection therewith, whereafter the angle, time delay and strength of the signal can be utilized for location derivation. Tracking of the collar may be initiated through a third-party software program that relays the collar geographic location on a map, and further may be utilized to plot out directions thereto. In the event the collar device is beyond the range of a cellular network, a back-up GPS unit can be utilized to map out the location of the collar based on signals sent to and from a GPS satellite.

During periods of inactivity and standby, a passive mode is contemplated by the present collar, wherein direct communication links are not actively being utilized. This passive mode is one in which the device is not actively operating the cellular functions, which preserves overall battery life. In this mode, the microprocessor may be awaiting commands or inputs from the user to initiate communication or operation of the collar. The passive mode is the default operational condition when the animal is not being tracked or communicated with.

Figure 4:
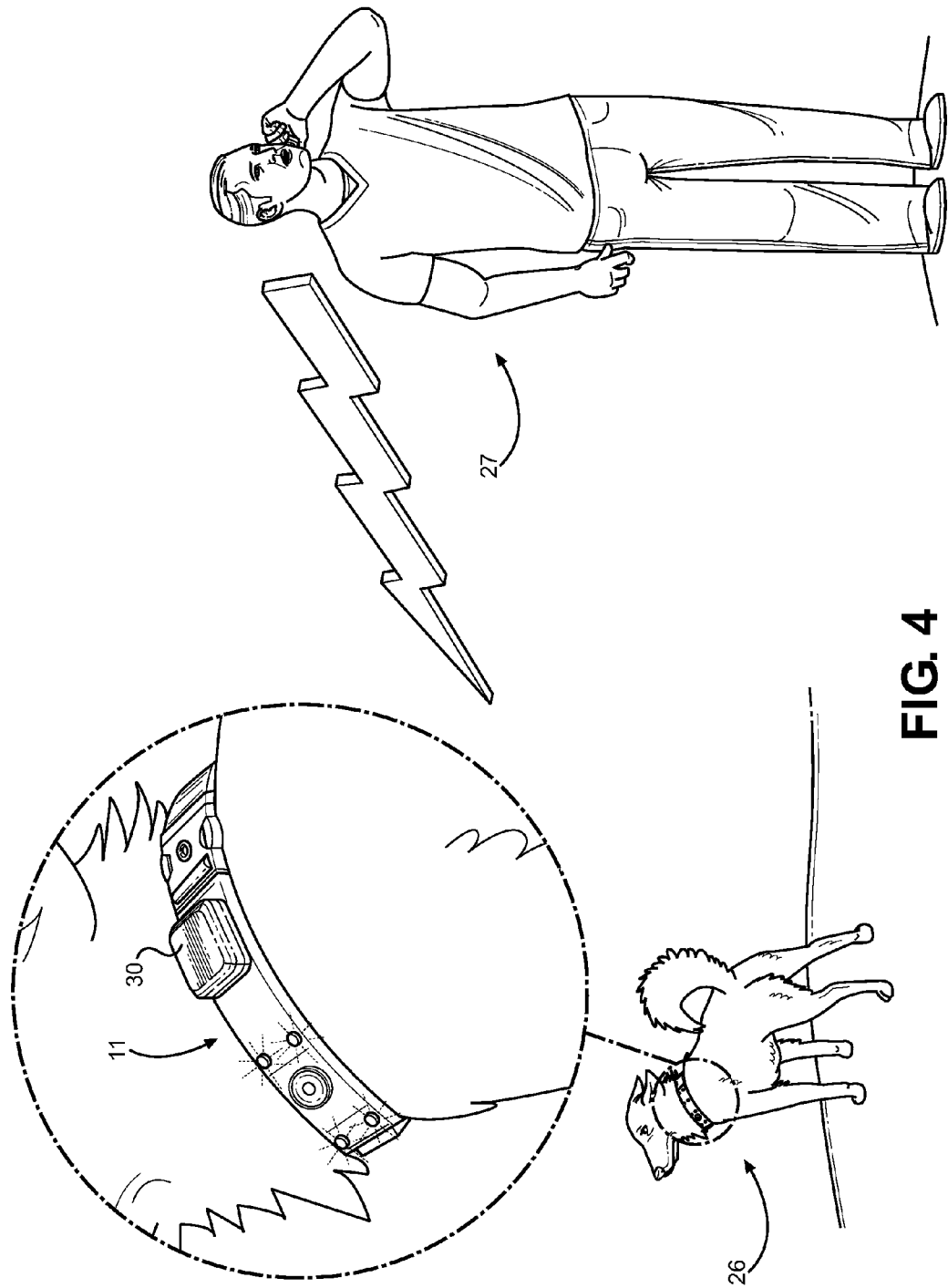
FIG. 4 shows a pictorial representation of the present animal collar in use, wherein communication is established between the collar and the user.

Referring now to FIG. 4, there is shown a pictorial representation of the operation of the device when direct communication is established between a user and a dog 26 via the cellular connection. The user is operating a cellular phone device to send voice commands to the dog via his collar assembly 11. This form of communication allows for commands to be given without the user yelling to the dog, for instance over large distances or if the dog is hard of hearing. This also allows the user to talk to an individual who may have recovered the lost dog after it has strayed. Cellular or GPS tracking 30 may further be utilized to track the location of the dog over larger distances, if visual locating is not possible. A final embodiment of the present invention contemplates the coordination of the present collar microprocessor with a smartphone device, tablet or personal computer, which contains a software application that controls the operation of the device. This includes tracking initiation, light sources control, communication links and associated tools for desired operation of the collar during a specific event or scenario. Direct control of the collar elements is possible through physical inputs on the collar, or in conjunction with wireless inputs from such a program, wherein the inputs are relayed over a cellular network. This provides a collar with very adaptable and user friendly controls, which are provided to facilitate tracking and communication with a target animal.

One of the many contemplated implementations of the present device includes facilitating coordination and communication during a hunting exercise. In this situation, it may be desired to employ a hunting dog such that a hunted prey animal may be tracked or flushed out of hiding for the hunter to engage thereafter. This is common for duck hunting and hunting land animals that may be hard to track or flush out into an open area. In these two situations, the hunting dog is leading the hunter to the prey, or is standing by for permission to chase out the prey animal from hiding. Communication between the animal and the hunter is essential for coordinated attacks and to prevent prey animals from easily overhearing and escaping their hunters. Direct voice communication via the cellular network allows the hunter to give voice commands to the hunting dog over great distances without raising his voice, such that the trained dog and hunter may engage a prey animal without being located in close proximity. Once the prey animal is flushed out, it can be shot, trapped or otherwise engaged, wherein "go" commands and "retrieve" commands may be necessary for the dog to initiate action. A similar situation during hunting exercises includes the possibility of the hunting dog and hunter becoming separated and lost from one another. Tracking via cellular networks, GPS and direct communication may then be established to recover the hunting dog, while the LED light sources may be activated to locate the dog in low light situations and in a wilderness backdrop. This is particularly useful for owners with larger plots of land and with animals having a darker coat or complexion, which may otherwise blend into the darker background and environment.

Referring finally to FIG. 5, there is shown a close-up perspective view of the locking mechanism of the present animal collar, which comprises a lockable buckle 18 having a cylinder lock 24 or similar locking mechanism that prevents the collar from being easily removable from the animal without the owner's permission. The owner may possess a key 25 that unlocks the clip within the buckle 18 for removing the collar assembly from the animal, preventing theft and removal of the tracking elements otherwise attached to the animal, which would make communication with and tracking of the animal impossible if the collar was not directly tethered thereto. In an embodiment of the locking mechanism, the locking cylinder controls a cam that prevents the clip 19 from exiting the buckle once engaged, whereafter the cam can be rotated by the cylinder into a position that allows the clip to be slid from the buckle with ease.

Overall, the present invention provides a new tracking and communication collar device that employs cellular network connectivity for the purposes of locating and controlling a target animal. Lost or stolen pets can be a tragedy for owners and their family, and likewise a hunting expedition may be fruitless without adequate coordinate between a hunting dog and hunter. Further still, working dogs for law enforcement, search and rescue and the military would benefit from such a device, along with professional animal trainers. The present collar device is therefore presented to fulfill two roles in the prior art and allow for flexibility of use depending on user preferences and the given situation. The electronic features facilitate improved communication and tracking of the animal, while the structural elements of the collar prevent tampering or damage to the electronic features during use, such that the collar is both highly effective and of rugged construction to allow robust and continued tracking of an animal in the potential scenarios previously outlined.

In light of the present disclosure and the related prior art, it is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An animal locating and communication collar, comprising:
    an elongated band having an internal cavity, a housing area and a first and second end having a removable attachment means;
    said band adapted to encircle a neck of an animal and provide a means of supporting a plurality of electronic tracking and communication elements;
    said electronic tracking and communication elements comprising a cellular connectivity unit, one or more speakers, one or more microphones, a plurality of light sources attached to said band, and a digital display screen for displaying information related to said animal and said animal owner;
    said cellular connectivity unit further comprising a cellular antenna connecting to an electronic circuit board comprising digital signal processor, internal memory containing a unique phone number associated with said cellular connectivity unit, a microprocessor having programmable logic to coordinate said electronic tracking and communication elements, and a battery power supply, Wherein said cellular connectivity unit is adapted to receive phone calls made to said phone number and initiate audio playback of said phone call via said speakers;
    said cellular connectivity unit adapted to send and receive cellular phone calls over a dedicated phone number to establish direct voice communication link allow voice communication from a remote user to said collar;
    a call back button adapted to initiate an outgoing phone call to a modifiable preprogrammed phone number,
    said microprocessor having an electrical power input and data connection for charging said battery power supply and uploading digital information to said internal memory.

2. The device of claim 1, further comprising a back-up GPS tracking unit adapted to track said collar location geographic location via satellite connection and relay said location to a user for tracking purposes.

3. The device of claim 1, further comprises one or more user input buttons to control programming options of said microprocessor for operation of said electronic tracking and communication elements.

4. The device of claim 1, wherein microprocessor electrical power input and data connection further comprises a universal serial bus (USB) connection.

5. The device of claim 1, wherein said collar band first and second end a removable attachment means further comprises a lockable buckle clip for secure positioning on said animal neck.

* * * * *